US012494215B2

(12) United States Patent
Seo et al.

(10) Patent No.: US 12,494,215 B2
(45) **Date of Patent: *Dec. 9, 2025**

(54) ENCODING/DECODING APPARATUS FOR PROCESSING CHANNEL SIGNAL AND METHOD THEREFOR

(71) Applicant: Electronics and Telecommunications Research Institute, Daejeon (KR)

(72) Inventors: Jeong Il Seo, Daejeon (KR); Seung Kwon Beack, Daejeon (KR); Dae Young Jang, Daejeon (KR); Kyeong Ok Kang, Daejeon (KR); Tae Jin Park, Daejeon (KR); Yong Ju Lee, Daejeon (KR); Keun Woo Choi, Daejeon (KR); Jin Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,181

(22) Filed: Nov. 30, 2023

(65) Prior Publication Data

US 2024/0119949 A1 Apr. 11, 2024

Related U.S. Application Data

(63) Continuation of application No. 17/706,400, filed on Mar. 28, 2022, now Pat. No. 11,875,802, which is a (Continued)

(30) Foreign Application Priority Data

Jan. 15, 2013 (KR) ........................ 10-2013-0004359
Jan. 15, 2014 (KR) ........................ 10-2014-0005056

(51) Int. Cl.
*G10L 19/008* (2013.01)
*H04S 3/00* (2006.01)

(52) U.S. Cl.
CPC .............. *G10L 19/008* (2013.01); *H04S 3/00* (2013.01)

(58) Field of Classification Search
CPC ................................. H04S 3/00; G10L 19/008
See application file for complete search history.

(56) References Cited

U.S. PATENT DOCUMENTS 10,068,579 B2 9/2018 Seo et al.
2010/0094631 A1 4/2010 Engdegard et al.
(Continued)

FOREIGN PATENT DOCUMENTS

KR 1020080089308 A 10/2008
KR 1020100086003 A 7/2010
(Continued)

OTHER PUBLICATIONS

"Information technology—High Efficiency Coding and Media Delivery in Heterogeneous Environments—Part 3: 3D Audio", ISO/IEC WD 23008-3, ISO/IEC JTC 1/SC 29 N, Aug. 13, 2013, pp. 1-129, ISO/IEC 2013.
(Continued)

*Primary Examiner* — James K Mooney
(74) *Attorney, Agent, or Firm* — WILLIAM PARK AND ASSOCIATES LTD.

(57) ABSTRACT

An encoding/decoding apparatus and method for controlling a channel signal is disclosed, wherein the encoding apparatus may include an encoder to encode an object signal, a channel signal, and rendering information for the channel signal, and a bit stream generator to generate, as a bit stream, the encoded object signal, the encoded channel signal, and the encoded rendering information for the channel signal.

20 Claims, 10 Drawing Sheets

Related U.S. Application Data continuation of application No. 16/447,573, filed on Jun. 20, 2019, now Pat. No. 11,289,105, which is a continuation of application No. 16/011,249, filed on Jun. 18, 2018, now Pat. No. 10,332,532, which is a continuation of application No. 14/758,642, filed as application No. PCT/KR2014/000443 on Jan. 15, 2014, now Pat. No. 10,068,579.

(56) References Cited

U.S. PATENT DOCUMENTS

| | | | |
|---|---|---|---|
| 2010/0106271 | A1 | 4/2010 | Oh et al. |
| 2011/0002469 | A1 | 1/2011 | Ojala |
| 2012/0051547 | A1 | 3/2012 | Disch et al. |
| 2012/0259643 | A1 | 10/2012 | Engdegard et al. |
| 2012/0314875 | A1 | 12/2012 | Lee et al. |
| 2014/0139738 | A1 | 5/2014 | Mehta et al. |
| 2016/0133262 | A1 | 5/2016 | Fueg et al. |
| 2016/0142854 | A1 | 5/2016 | Fueg et al. |
| 2016/0157040 | A1 | 6/2016 | Ertel et al. |
| 2016/0198281 | A1 | 7/2016 | Oh et al. |
| 2016/0323688 | A1 | 11/2016 | Lee et al. |

FOREIGN PATENT DOCUMENTS

| | | | |
|---|---|---|---|
| KR | 1020100138716 | A | 12/2010 |
| KR | 1020140000337 | A | 1/2014 |
| WO | 2013006338 | A2 | 1/2013 |

OTHER PUBLICATIONS

English machine translation of KR-10-2013-0004359.
EP 13189230, foreign priority document for 2016/0142854.

FIG. 3

```
renderingInfo_for_MBO {
    frame_index
    gain_factor
    horizontal_rotation_angle
    vertical_rotation_angle
}
```

FIG. 4

```
renderingInfo_for_MBO {
    frame_index
    gain_factor
}
```

ENCODING/DECODING APPARATUS FOR PROCESSING CHANNEL SIGNAL AND METHOD THEREFOR

CROSS-REFERENCE TO RELATED APPLICATIONS

The present application is a continuation application of U.S. application Ser. No. 17/706,400, filed on Mar. 28, 2022, which is a continuation application of U.S. application Ser. No. 16/477,573, filed on Jun. 20, 2019, which is a continuation application of U.S. application Ser. No. 16/011,249, filed on Jun. 18, 2018, which is a continuation application of U.S. application Ser. No. 14/758,642, filed on Jun. 30, 2015, which was the National Stage of International Application No. PCT/KR2014/000443 filed on Jan. 15, 2014, which claims priority to Korean Patent Applications: KR10-2014-0005056, filed on Jan. 15, 2014, and KR10-2013-0004359, filed on Jan. 15, 2013, with the Korean Intellectual Property Office, which are incorporated herein by reference in their entirety.

TECHNICAL FIELD

The present invention relates to an encoding/decoding apparatus and method that may process a channel signal, and more particularly, to an encoding/decoding apparatus and method that may process a channel signal by encoding and transmitting rendering information for the channel signal along with the channel signal and an object signal.

BACKGROUND ART

When playing an audio content including multiple channel signals, for example, an Moving Picture Experts Group (MPEG)-H 3D Audio and Dolby Atmos, and multiple object signals, object signal control information generated based on a number of speakers, a speaker array environment, and a position of a speaker, or rendering information may be adequately converted and thus, the audio content may be adequately played in accordance with an intention of a manufacturer.

However, in a case of channel signals arranged in a group in a two-dimensional or a three-dimensional space, a function of processing the channel signals, as a whole, may be necessary.

DISCLOSURE OF INVENTION

Technical Goals

An aspect of the present invention provides an apparatus and a method that may provide a function of processing a channel signal based on a speaker array environment which an audio content is played by encoding and transmitting rendering information for the channel signal along with the channel signal and an object signal.

Technical Solutions

According to an aspect of the present invention, there is provided an encoding apparatus including an encoder to encode an object signal, a channel signal, and rendering information for a channel signal, and a bitstream generator to generate, as a bitstream, the encoded object signal, the encoded channel signal, and the encoded rendering information for the channel signal.

The bitstream generator may store the generated bitstream in a storage medium or transmit the generated bitstream to a decoding apparatus through a network.

The rendering information for the channel signal may include at least one of control information to control a volume or a gain of the channel signal, control information to control a horizontal rotation of the channel signal, and control information to control a vertical rotation of the channel signal.

According to another aspect of the present invention, there is provided a decoding apparatus including a decoder to extract an object signal, a channel signal, and rendering information for the channel signal from a bitstream generated by an encoding apparatus, and a renderer to render the object signal and the channel signal based on the rendering information for the channel signal.

The rendering information for the channel signal may include at least one of control information to control a volume or a gain of the channel signal, control information to control a horizontal rotation of the channel signal, and control information to control a vertical rotation of the channel signal.

According to still another aspect of the present invention, there is provided an encoding apparatus including a mixer to render input object signals and mix the rendered object signals and channel signals, and an encoder to encode the object signals and the channel signals output by the mixer and additional information for an object signal and a channel signal. The additional information may include a number and a file name of the encoded object signals and the encoded channel signals.

According to yet another aspect of the present invention, there is provided a decoding apparatus including a decoder to output object signals and channel signals from a bitstream, and a mixer to mix the object signals and the channel signals. The mixer may mix the object signals and the channel signals based on a number of channels, a channel element, and channel configuration information defining speaker mapping with a channel.

The decoding apparatus may further include a binaural renderer to perform binaural rendering on the channel signals output by the mixer.

The decoding apparatus may further include a format converter to convert a format of the channel signals output by the mixer based on a speaker reproduction layout.

According to further another aspect of the present invention, there is provided an encoding method including encoding an object signal, a channel signal, and rendering information for a channel signal, and generating, as a bitstream, the encoded object signal, the encoded channel signal, and the encoded rendering information for the channel signal.

The encoding method may further include storing the generated bitstream in a storing medium, or transmitting the generated bitstream to a decoding apparatus through a network.

The rendering information for the channel signal may include at least one of control information to control a volume or a gain of the channel signal, control information to control a horizontal rotation of the channel signal, and control information to control a vertical rotation of the channel signal.

According to still another aspect of the present invention, there is provided a decoding method including extracting an object signal, a channel signal, and rendering information for the channel signal from a bitstream generated by an encoding apparatus, and rendering the object signal and the channel signal based on the rendering information for the channel signal.

The rendering information for the channel signal may include at least one of control information to control a volume or a gain of the channel signal, control information to control a horizontal rotation of the channel signal, and control information to control a vertical rotation of the channel signal.

According to still another aspect of the present invention, there is provided an encoding method including rendering input object signals and mixing the rendered object signals and channel signals, and encoding the object signals and the channel signals output through the mixing and additional information for an object signal and a channel signal. The additional information may include a number and a file name of the encoded object signals and the encoded channel signals.

According to still another aspect of the present invention, there is provided a decoding method including outputting object signals and channel signals from a bitstream, and mixing the object signals and the channel signals. The mixing may be performed based on a number of channels, a channel element, and channel configuration information defining a speaker mapping with a channel.

The decoding method may further include performing binaural rendering on the channel signals output through the mixing.

The decoding method may further include converting a format of the channel signals output through the mixing based on a speaker reproduction layout.

Effects of Invention

According to embodiments of the present invention, rendering information for a channel signal may be encoded and transmitted along with the channel signal and an object signal and thus, a function of processing the channel signal based on an environment in which an audio content is output may be provided.

BRIEF DESCRIPTION OF DRAWINGS

FIG. 3 illustrates an example of rendering information for a channel signal according to an embodiment of the present invention.

FIG. 4 illustrates another example of rendering information for a channel signal according to an embodiment of the present invention.

BEST MODE FOR CARRYING OUT THE INVENTION

Figure 1:
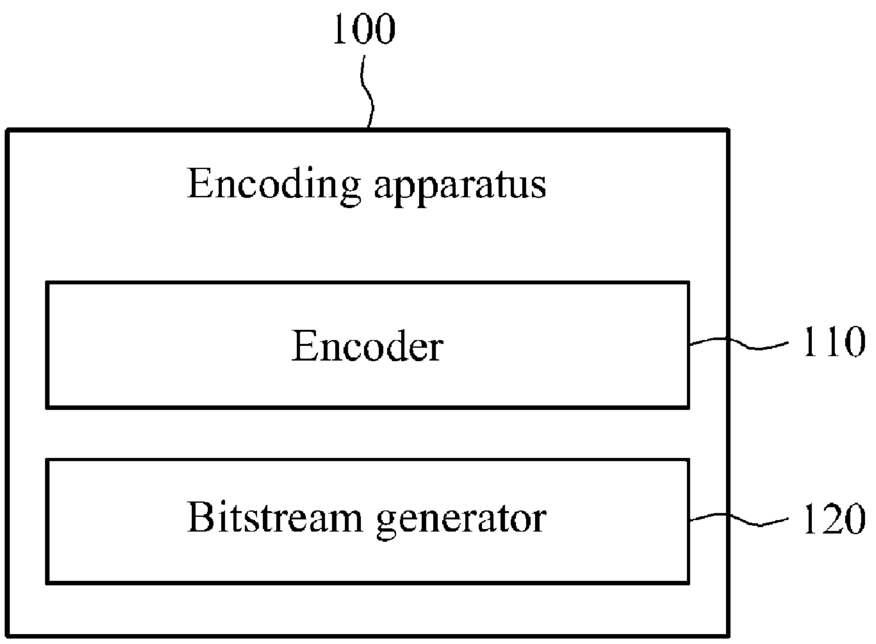
FIG. 1 is a block diagram illustrating a configuration of an encoding apparatus according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures. An encoding method and a decoding method may be performed by an encoding apparatus and a decoding apparatus.

FIG. 1 is a block diagram illustrating a configuration of an encoding apparatus 100 according to an embodiment of the present invention.

Referring to FIG. 1, the encoding apparatus 100 may include an encoder 110 and a bitstream generator 120.

The encoder 110 may encode an object signal, a channel signal, and rendering information for a channel signal.

For example, the rendering information for the channel signal may include at least one of control information to control a volume or a gain of the channel signal, control information to control a horizontal rotation of the channel signal, and control information to control a vertical rotation of the channel signal.

Also, the rendering information for the channel signal may include the control information to control the volume and the gain of the channel signal for a user terminal having a low performance with which the channel signal may be difficult to be rotated in a direction.

The bitstream generator 120 may generate, as a bitstream, the object signal, the channel signal, and the rendering information for the channel signal that are encoded by the encoder 110. The bitstream generator 120 may store the generated bitstream, as a form of a file, in a storage medium. Alternatively, the bitstream generator 120 may transmit the generated bitstream to a decoding apparatus through a network.

The channel signal may indicate a signal arranged in a group in an entire two-dimensional (2D) or three-dimensional (3D) space. Thus, the rendering information for the channel signal may be used to control an entire volume or an entire gain of the channel signal or rotate an entire channel signal.

Transmitting the rendering information for the channel signal along with the channel signal and the object signal may enable a function of processing the channel signal to be provided based on an environment in which an audio content is output.

Figure 2:
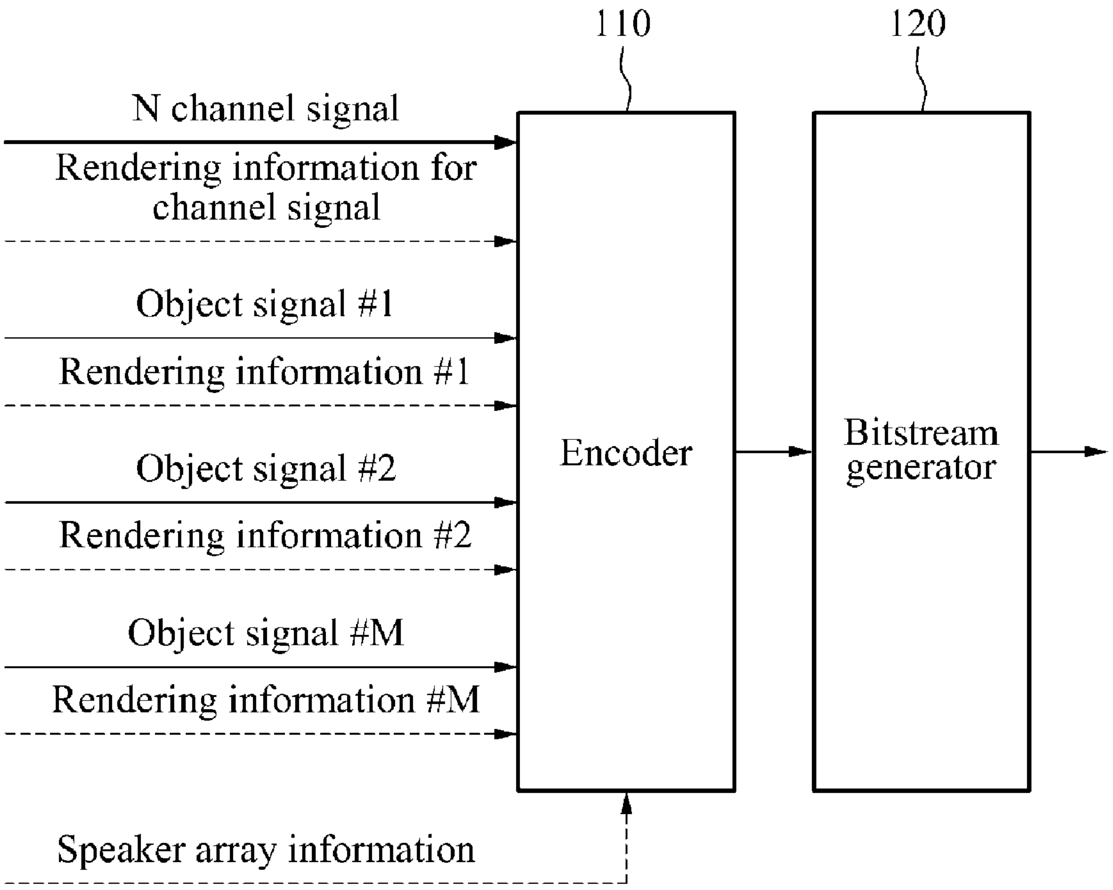
FIG. 2 is a diagram illustrating information input to an encoding apparatus according to an embodiment of the present invention.

FIG. 2 is a diagram illustrating information input to an encoding apparatus 100 of FIG. 1 according to an embodiment of the present invention.

Referring to FIG. 2, N channel signals and M object signals may be input to the encoding apparatus 100. In addition to rendering information for each of the M object signals, rendering information for each of the N channel signals may be input to the encoding apparatus 100. Also, speaker array information that may be considered to manufacture an audio content may be input to the encoding apparatus 100.

An encoder 110 may encode the input N channel signals, the input M object signals, the input rendering information for the channel signal, and the input rendering information for the object signal. A bitstream generator 120 may generate a bitstream based on a result of the encoding. The bitstream generator 120 may store the generated bitstream as a form of a file in a storage medium or transmit the generated bitstream to a decoding apparatus.

FIG. 3 illustrates an example of rendering information for a channel signal according to an embodiment of the present invention.

When a channel signal is input corresponding to a plurality of channels, the channel signal may be used as a background sound. Here, a Multi-Channel Background Object (MBO) class may indicate the channel signal is used as the background sound.

For example, the rendering information for the channel signal may include at least one of control information to control a volume or a gain of the channel signal, control information to control a horizontal rotation of the channel signal, and control information to control a vertical rotation of the channel signal.

Referring to FIG. 3, the rendering information for the channel signal may be indicated as "renderinginfo_for_MBO." Also, the control information to control the volume or the gain of the channel signal may be defined as "gain_factor." The control information to control the horizontal rotation of the channel signal may be defined as "horizontal_rotation_angle." The horizontal rotation angle may indicate a rotation angle for rotating the channel signal in a horizontal direction.

The control information to control the vertical rotation of the channel signal may be defined as "vertical_rotation_angle." The vertical_rotation_angle may indicate a rotation angle for rotating the channel signal in a vertical direction. Also, "frame_index" may indicate an audio frame identification number to which the rendering information for the channel signal is applied.

FIG. 4 illustrates another example of rendering information for a channel signal according to an embodiment of the present invention.

When performance of a terminal playing a channel signal is lower than a predetermined standard, a function of rotating the channel signal may not be performed. In this case, the rendering information for the channel signal including control information to control a volume or a gain of the channel signal may include "gain_factor" as illustrated in FIG. 4.

For example, when an audio content includes M channel signals and N object signals, and the M channel signals correspond to M instrument signals as a background sound and the N object signals correspond to singer voice signals, a decoding apparatus may control a position and a magnitude of the singer voice signals. Alternatively, the decoding apparatus may remove the singer voice signals corresponding to the object signals from the audio content and obtain an accompaniment sound for karaoke.

Also, the decoding apparatus may remove the magnitude, for example, the volume and the gain, of the M instrument signals using the rendering information for the M instrument signals, or rotate all the M instrument signals in a vertical or a horizontal direction. The decoding apparatus may play the singer voice signals exclusively by removing all the M instrument signals corresponding to the channel signals from the audio content.

Figure 5:
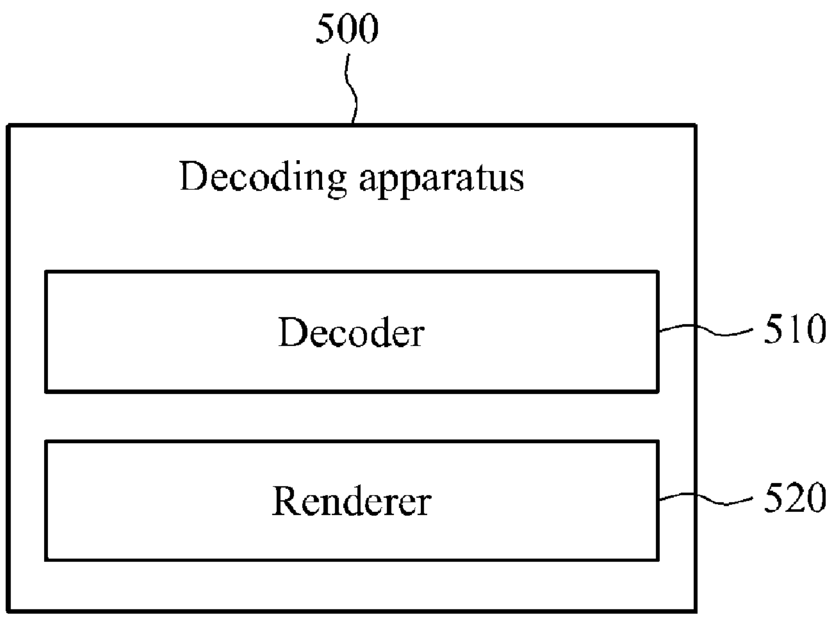
FIG. 5 is a block diagram illustrating a configuration of a decoding apparatus according to an embodiment of the present invention.

FIG. 5 is a block diagram illustrating a configuration of a decoding apparatus 500 according to an embodiment of the present invention.

Referring to FIG. 5, the decoding apparatus 500 may include a decoder 510 and a renderer 520.

The decoder 510 may extract an object signal, a channel signal, and rendering information for a channel signal from a bitstream generated by an encoding apparatus.

The renderer 520 may render the object signal and the channel signal based on the rendering information for the channel signal, rendering information for the object signal, and speaker array information. Here, the rendering information for the channel signal may include at least one of control information to control a volume or a gain of the channel signal, control information to control a horizontal rotation of the channel signal, and control information to control a vertical rotation of the channel signal.

Figure 6:
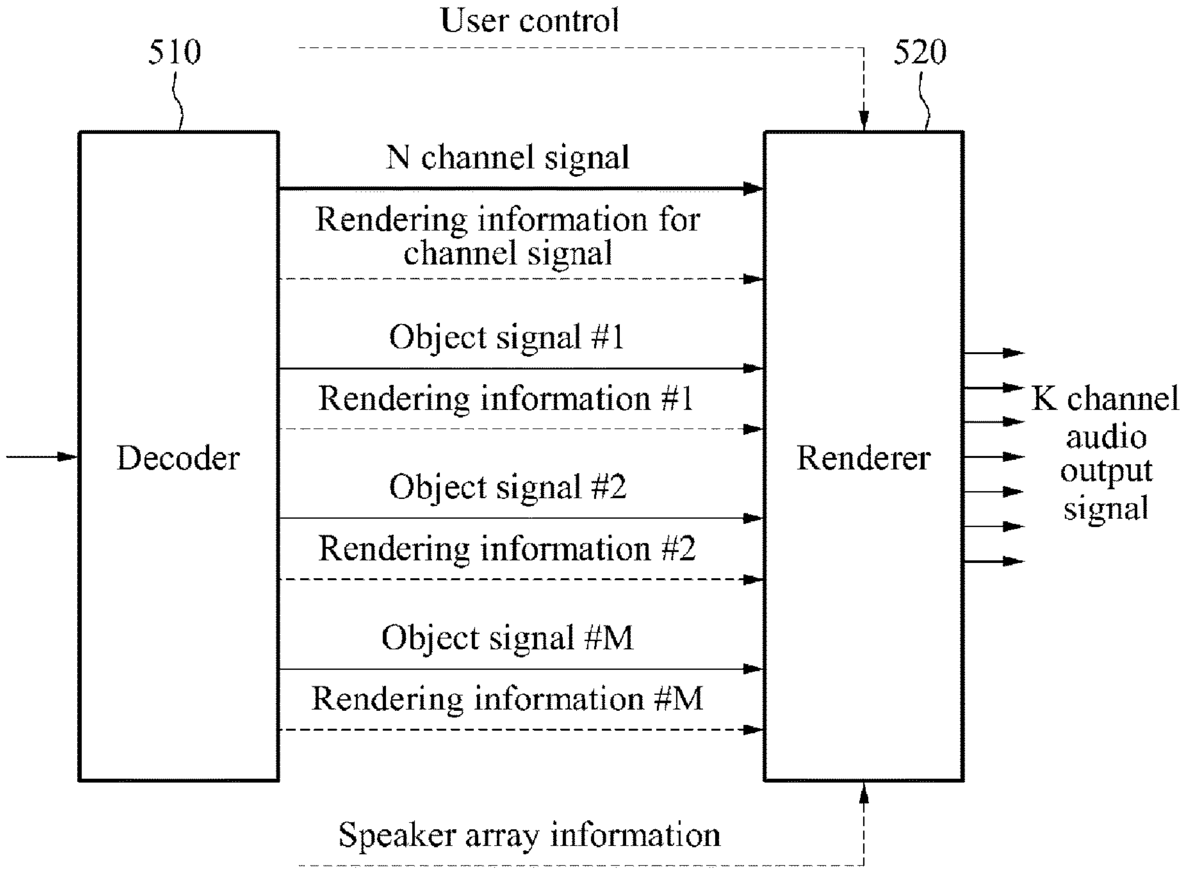
FIG. 6 is a diagram illustrating information input to a decoding apparatus according to an embodiment of the present invention.

FIG. 6 is a diagram illustrating information input to a decoding apparatus 500 of FIG. 5.

The decoder 510 of the decoding apparatus 500 may extract, from a bitstream generated by an encoding apparatus, N channel signals, rendering information for all the N channel signals, M object signals, and rendering information for each of the M object signals.

The decoder 510 may transmit, to the renderer 520, the N channel signals, the rendering information for all the N channel signals, the M channel signals, and the rendering information for each of the M object signals.

The renderer 520 may generate an audio output signal including K channels using the N channel signals, the rendering information for all the N channel signals, the M channel signals, and the rendering information for each of the M object signals that are transmitted from the decoder 510, additionally input user control, and speaker array information about speakers connected to the decoding apparatus 500.

Figure 7:
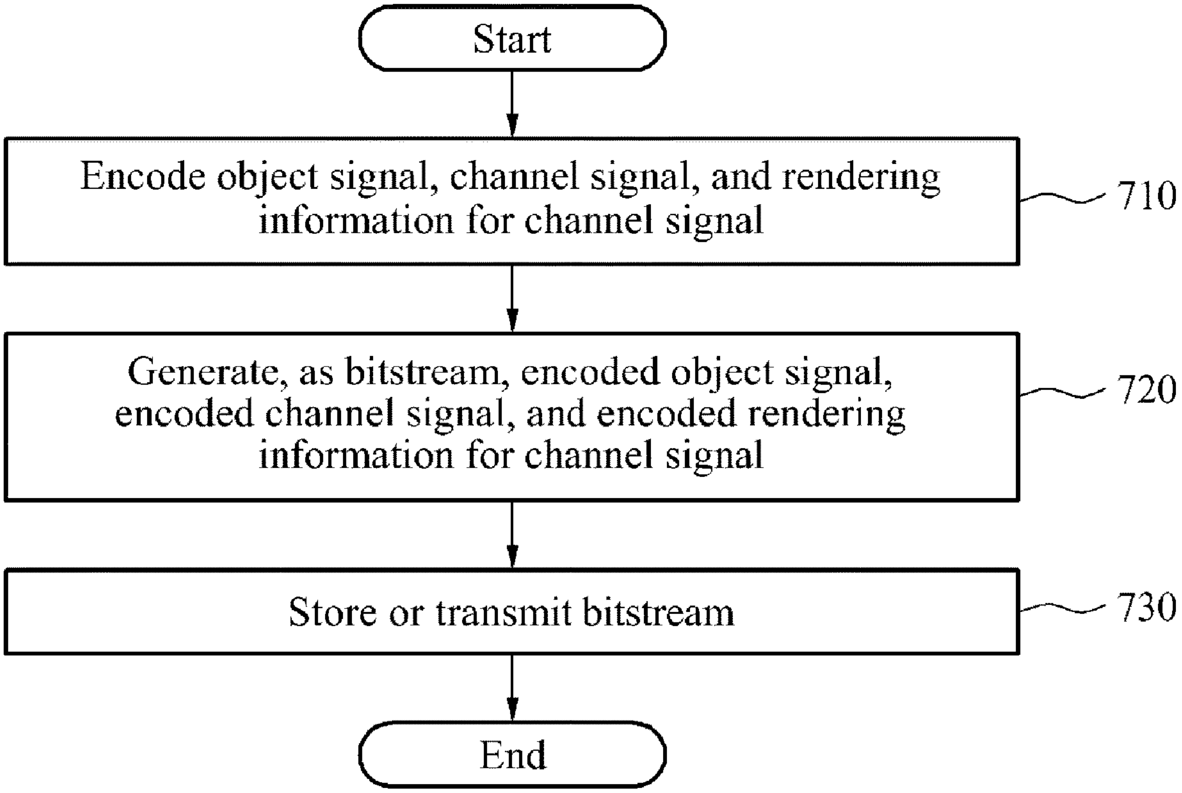
FIG. 7 is a flowchart illustrating an encoding method according to an embodiment of the present invention.

FIG. 7 is a flowchart illustrating an encoding method according to an embodiment of the present invention.

In operation 710, an encoding apparatus may encode an object signal, a channel signal, and additional information for playing an audio content including the object signal and the channel signal. Here, the additional information may include rendering information for the channel signal, rendering information for the object signal, and speaker array information that may be considered when manufacturing the audio content.

The rendering information for the channel signal may include at least one of control information to control a volume or a gain of the channel signal, control information to control a horizontal rotation of the channel signal, and control information to control a vertical rotation of the channel signal.

In operation 720, the encoding apparatus may generate a bitstream using a result of encoding the object signal, the channel signal, and the additional information for playing the audio content including the object signal and the channel signal. The encoding apparatus may store the generated bitstream as a form of a file in a storage medium or transmit the generated bitstream to a decoding apparatus through a network.

Figure 8:
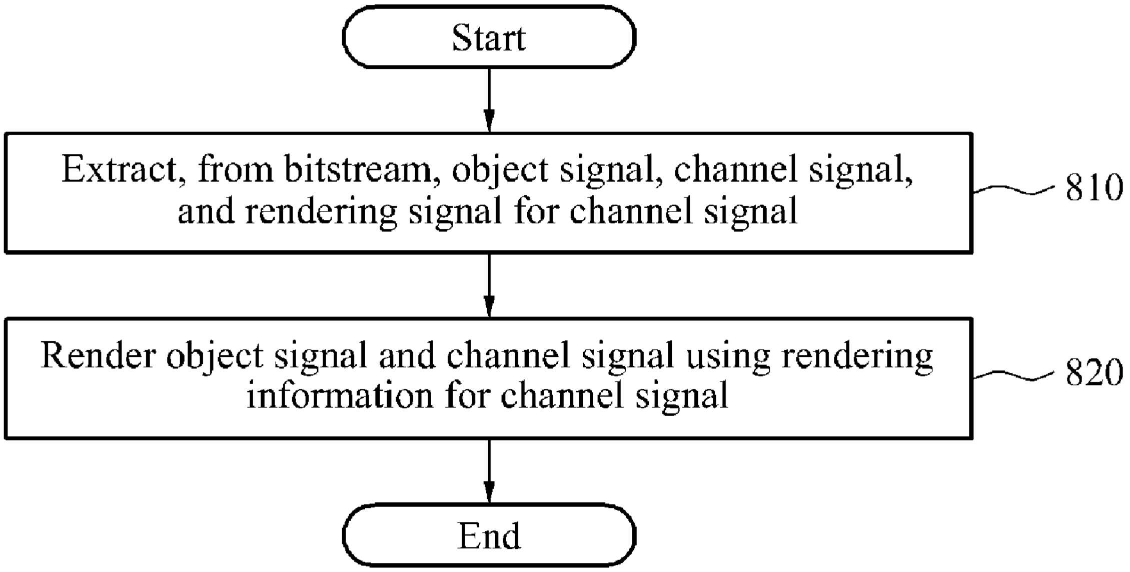
FIG. 8 is a flowchart illustrating a decoding method according to an embodiment of the present invention.

FIG. 8 is a flowchart illustrating a decoding method according to an embodiment of the present invention.

In operation 810, a decoding apparatus may extract, from a bitstream generated by an encoding apparatus, an object signal, a channel signal, and additional information. Here, the additional information may include rendering information for the channel signal, rendering information for the object signal, and speaker array information about speakers connected to the decoding apparatus.

The rendering information for the channel signal may include at least one of control information to control a volume or a gain of the channel signal, control information to control a horizontal rotation of the channel signal, and control information to control a vertical rotation of the channel signal.

In operation 820, the decoding apparatus may perform rendering based on the additional information so that the channel signal and the object signal correspond to the speaker array information about the speakers connected to the decoding apparatus and may output an audio content to be played.

Figure 9:
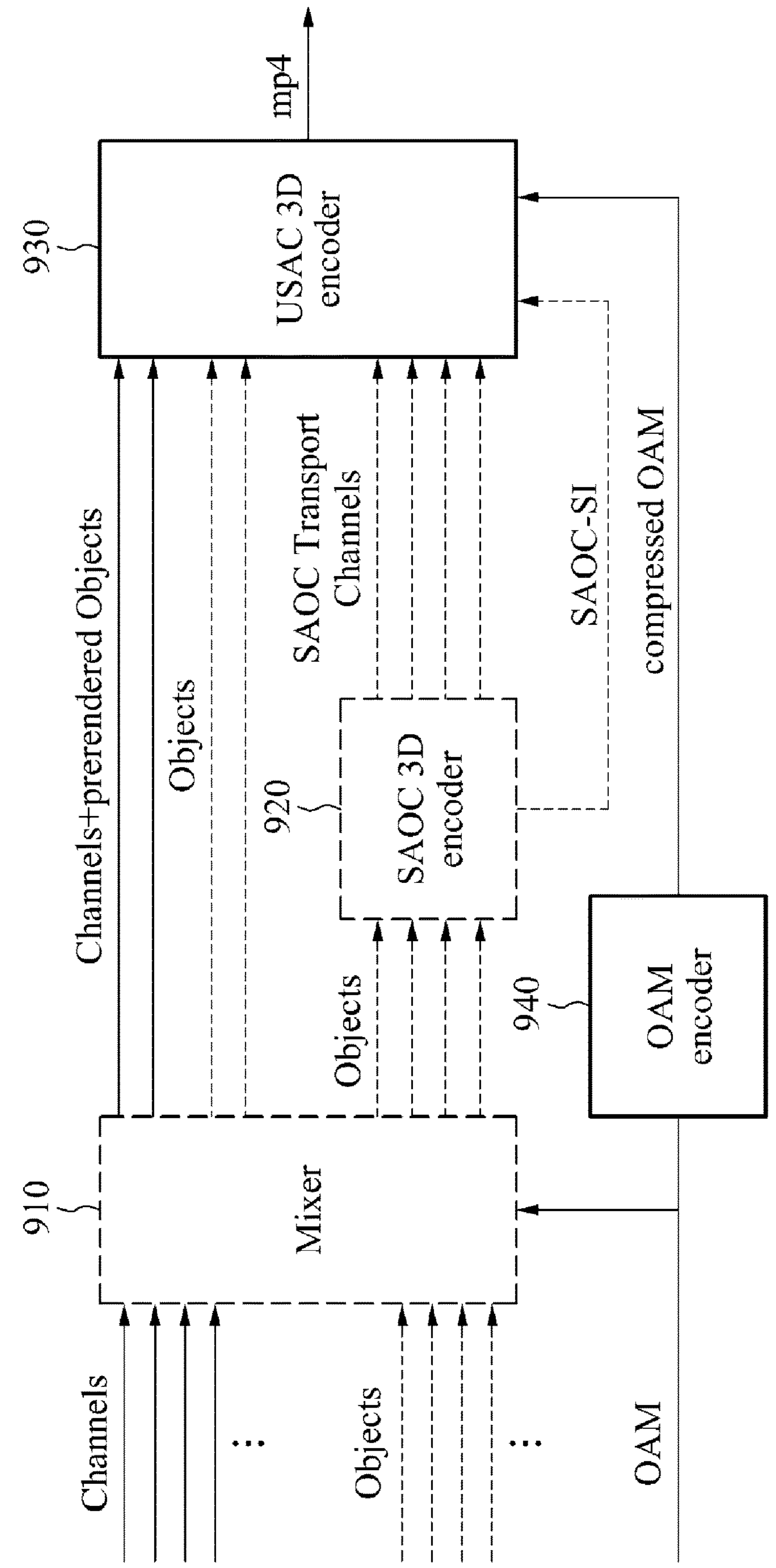
FIG. 9 is a diagram illustrating a configuration of an encoding apparatus according to another embodiment of the present invention.

FIG. 9 is a diagram illustrating a configuration of an encoding apparatus according to another embodiment of the present invention.

Referring to FIG. 9, the encoding apparatus may include a mixer 910, a Spatial Audio Object Coding (SAOC) 3D encoder 920, a Unified Speech and Audio Coding (USAC) 3D encoder 930, and an object metadata (OAM) encoder 940.

The mixer 910 may render input object signals or mix object signals and channel signals. Also, the mixer 910 may prerender the input object signals. More particularly, the mixer 910 may convert a combination of the input channel signals and the input object signals to a channel signal. The mixer 910 may render a discrete object signal into a channel layout through the prerendering. A weight on each of the object signals for respective channel signals may be obtained from an OAM. The mixer 910 may output downmixed object signals and unmixed object signals as a result of the combination of the channel signals and the prerendered object signals.

The SAOC 3D encoder 920 may encode object signals based on a Moving Picture Experts Group (MPEG) SAOC technology. The SAOC 3D encoder 920 may regenerate, modify, and render N object signals, and generate M transport channels and additional parametric information. Here, a value of "M" may be less than a value of "N." Also, the additional parametric information may be indicated as "SAOC-SI" and include spatial parameters between the object signals, for example, object level difference (OLD), inter object cross correlation (IOC), and downmix gain (DMG).

The SAOC 3D encoder 920 may adopt an object signal and a channel signal as a monophonic waveform, and output parametric information to be packaged in a 3D audio bitstream and an SAOC transport channel. The SAOC transport channel may be encoded using a single channel element.

The USAC 3D encoder 930 may encode channel signals of a loudspeaker, discrete object signals, object downmix signals, and prerendered object signals based on an MPEG USAC technology. The USAC 3D encoder 930 may generate channel mapping information and object mapping information based on geometric information or semantic information for an input channel signal and an input object signal. Here, the channel mapping information and the object mapping information may indicate a manner in which channel signals and object signals map with USAC channel elements, for example, channel pair elements (CPEs), single channel elements (SCEs), and low frequency effects (LFEs).

The object signals may be encoded in a different manner based on rate/distortion requirements. The prerendered object signals may be coded to a 22.2 channel signal. The discrete object signals may be input as a monophonic waveform to the USAC 3D encoder 930. The USAC 3D encoder 930 may use the SCEs to add the object signals to the channel signals and transmit the object signals.

Also, parametric object signals may be defined by SAOC parameters indicating a relationship between attributes of the object signals and the object signals. A result of downmixing the object signals may be encoded using the USAC technology and the parametric information may be transmitted separately. A number of downmix channels may be determined base on a number of the object signals and an overall data rate. Object metadata encoded by the OAM encoder 940 may be input to the USAC 3D encoder 930.

The OAM encoder 940 may quantize temporal or spatial object signals and encode the object metadata indicating a geometric position and a volume of each object signal in a 3D space. The encoded object metadata may be transmitted to a decoding apparatus as additional information.

A description of various forms of input information that are input to an encoding apparatus will be provided hereinafter. More particularly, channel based input data, object based input data, and high order ambisonic (HOA) input data may be input to the encoding apparatus.

(1) Channel Based Input Data

The channel based input data may be transmitted as a set of monophonic channel signals. Each channel signal may be indicated as a monophonic, waveform audio file format (.wav) file.

The monophonic .wav file may be defined as below:

<item_name>_A<azimuth_angle>_E<elevation_angle>.wav

Here, "azimuth_angle" may be expressed as ±180 degrees. A positive number may indicate a progression in a left direction. Also, "elevation_angle" may be expressed as ±90 degrees. A positive number may indicate an upward progression.

In a case of an LFE channel, a definition may be as follows:

<item_name>_LFE<lfe_number>.wav

Here, "lfe_number" may denote 1 or 2.

(2) Object Based Input Data

The object based input data may be transmitted as a set of monophonic audio contents and metadata. Each audio content may be indicated as a monophonic .wav file.

The audio content may include a channel audio content or an object audio content.

When the audio content includes the object audio content, the .wav file may be defined as below:

<item_name>_<object_id_number>.wav

Here, "object_id_number" may denote an object identification number.

When the audio content includes the channel audio content, the .wav file may be expressed as and mapped with a loudspeaker, as below:

<item_name>_A<azimuth_angle>_E<elevation_angle>.wav

Level calibration and delay alignment may be performed on object audio contents. For example, when a listener is at a sweet-spot listening position, two events occurring from two object signals in an identical sample index may be recognized. When a position of an object signal is changed, a perceived level and delay with respect to the object signal may not be changed. Calibration of the audio content may be considered calibration of the loudspeaker.

An object metadata file may be used to define metadata for a scene in which channel signals and object signals are combined. The object metadata may be indicated as <item_name>.OAM. The object metadata file may include a number of the object signals and a number of the channel signals that participate in the scene. The object metadata file may start from a header providing entire information in a scene describer. A series of channel description data fields and object description data fields may be given subsequent to the header.

At least one of channel description fields <number_of_channel_signals> and object description fields <number_of_object_signals> may be obtained subsequent to the file header.

TABLE 1

| Syntax | No. of bytes | Data format |
|---|---|---|
| description_file ( ) { | | |
| scene_description_header( ) | | |
| while (end_of_file == 0) { | | |
| for (i=0; i<number_of_object_signals; i++) { | | |
| object_data(i) | | |
| } | | |
| } | | |
| } | | |

In Table 1, "scene_description_header( )" may indicate the header providing the entire information in the scene description. Also, "object_data(i)" may indicate object description data for an ith object signal.

TABLE 2

| Syntax | No. of bytes | Data format |
|---|---|---|
| scene_description_header( ) { | | |
| format_id_string | 4 | char |
| format_version | 2 | unsigned int |
| number_of_channel_signals | 2 | unsigned int |
| number_of_object_signals | 2 | unsigned int |
| description_string | 32 | char |
| for (i=0; i<number_of_channel_signals; i++) { | 64 | char |
| channel_file_name | | |
| } | | |
| for (i=0; i<number_of_object_signals; i++) { | 64 | char |
| object_description | | |
| } | | |
| } | | |

In Table 2, "format_id_string" may indicate an OAM unique character identifier.

Also, "format_version" and "number_of_channel_signals" may denote a number of file format versions and a number of channel signals compiled in a scene, respectively. When the number_of_channel_signals indicates "0," the scene may be based solely on the object signals.

"number_of_object_signals" may denote a number of object signals compiled in a scene. When the number_of_object_signals indicates "0," the scene may be based solely on the channel signals.

"description_string" may include a content describer readable to human beings.

"channel_file_name" may indicate a description string including a name of an audio channel file.

"object_description" may indicate a description string including a text description describing an object and readable to human beings.

The number_of_channel_signals and the channel_file_name may indicate rendering information for a channel signal.

TABLE 3

| Syntax | No. of bytes | Data format |
|---|---|---|
| object_data( ) { | | |
| sample_index | 8 | unsigned int |
| object_index | 2 | unsigned int |
| position_azimuth | 4 | 32-bit float |
| position_elevation | 4 | 32-bit float |
| position_radius | 4 | 32-bit float |
| gain_factor | 4 | 32-bit float |
| } | | |

In Table 3, "sample_index" may indicate a sample based on a time stamp indicating a time position inside an audio content in the sample to which an object description is allocated. The "sample_index" of a first sample of the audio content may be expressed as "0."

"object_index" may indicate an object number referring to the audio content to which an object is allocated. In a case of a first object signal, the object index may be expressed as "0."

"position_azimuth" may indicate a position of an object signal and expressed as an azimuth (°) in a range of −180 degrees to +180 degrees.

"position_elevation" may indicate a position of the object signal and expressed as an elevation (°) in a range of −90 degrees to +90 degrees.

"position_radius" may indicate a position of the object signal and expressed as a radius (m).

"gain_factor" may indicate a gain or a volume of an object signal.

All object signals may have a given azimuth, a given elevation, and a given radius in a defined time stamp. A renderer of a decoding apparatus may calculate a panning gain at the given azimuth. The panning gain between pairs of adjacent time stamps may be linearly interpolated. The renderer of the decoding apparatus may calculate a signal of a loudspeaker by applying a method in which a position of an object signal with respect to a listener at a sweet-spot position corresponds to a perceived direction. The interpolation may be performed so that the given azimuth of the object signal accurately reaches a corresponding sample index.

The renderer of the decoding apparatus may convert a scene expressed by an object metadata file and an object description to a .wav file including a 22.2 channel loudspeaker signal. A channel based content with respect to each loudspeaker signal may be added by the renderer.

A vector base amplitude panning (VBAP) algorithm may play a content obtained by a mixer at a sweet-spot position. The VBAP algorithm may use a triangle mesh including three vertexes to calculate the panning gain.

TABLE 4

| Triangle # | Vertex 1 | Vertex 2 | Vertex 3 |
|---|---|---|---|
| 1 | TpFL | TpFC | TPC |
| 2 | TpFC | TpFR | TpC |
| 3 | TpSiL | BL | SiL |
| 4 | BL | TpSiL | TpBL |
| 5 | TpSiL | TpFL | TpC |
| 6 | TpBL | TpSiL | TpC |
| 7 | BR | TpSiR | SiR |
| 8 | TpSiR | BR | TpBR |

TABLE 4-continued

| Triangle # | Vertex 1 | Vertex 2 | Vertex 3 |
|---|---|---|---|
| 9 | TpFR | TpSiR | TpC |
| 10 | TpSiR | TpBR | TpC |
| 11 | BL | TpBC | BC |
| 12 | TpBC | BL | TpBL |
| 13 | TpBC | BR | BC |
| 14 | BR | TpBC | TpBR |
| 15 | TpBC | TpBL | TpC |
| 16 | TpBR | TpBC | TpC |
| 17 | TpSiR | FR | SiR |
| 18 | FR | TpSiR | TpFR |
| 19 | FL | TpSiL | SiL |
| 20 | TpSiL | FL | TpFL |
| 21 | BtFL | FL | SiL |
| 22 | FR | BtFR | SiR |
| 23 | BtFL | FLc | FL |
| 24 | TpFC | FLc | FC |
| 25 | FLc | BtFC | FC |
| 26 | FLc | BtFL | BtFC |
| 27 | FLc | TpFC | TpFL |
| 28 | FL | FLc | TpFL |
| 29 | FRc | BtFR | FR |
| 30 | FRc | TpFC | FC |
| 31 | BtFC | FRc | FC |
| 32 | BtFR | FRc | BtFC |
| 33 | TpFC | FRc | TpFR |
| 34 | FRc | FR | TpFR |

The 22.2 channel signal may not support an audio source present below a position of a listener (elevation<0°), excluding playing an object signal positioned lower in front and an object signal positioned on a side in front. It may be possible to calculate the audio source less than or equal to constraints given by a loudspeaker setup. The renderer may set a minimum elevation of an object signal based on an azimuth of the object signal.

The minimum elevation may be determined based on a loudspeaker at a possibly lowest position in a setup of the reference 2.2 channel. For example, an object signal at an azimuth 45° may have a minimum elevation of −15°. When an elevation of an object signal is less than the minimum elevation, the elevation of the object signal may be automatically adjusted to be the minimum elevation prior to the calculation of the VBAP panning gain.

The minimum elevation may be determined by an azimuth of an audio object as below.

The minimum elevation of an object signal positioned in front, with the azimuth indicating a space between BtFL (45°) and BtFR (−45°), may be −15°.

The minimum elevation of an object signal positioned in rear, with the azimuth indicating a space between SiL (90°) and SiR (−90°), may be 0°.

The minimum elevation of an object signal with the azimuth indicating a space between SiL (90°) and BtFL (45°) may be determined by a line connecting directly to BtFL.

The minimum elevation of an object signal with the azimuth indicating a space between SiL (90°) and BtFL (−45°) may be determined by a line connecting SiL directly to BtFL.

(3) HOA Based Input Data

The HOA based input data may be transmitted as a set of monophonic channel signals. Each channel signal may be indicated as a monophonic .wav file having a sampling rate of 48 kilohertz (kHz).

A content of each .wav file may be an HOA real-number coefficient signal of a time domain and be expressed as an HOA component $b_n^m(t)$.

A sound field description (SFD) may be determined based on Equation 1.

$$p(k, r, \theta, \phi) = \sum_{n=0}^{N} \sum_{m=-n}^{n} i^n B_n^m(k) j_n(kr) Y_n^m(\theta, \phi) \quad \text{[Equation 1]}$$

In Equation 1, an HOA real-number coefficient of the time domain may be expressed as $b_n^m(t) = i\mathcal{F}_t\{B_n^m(k)\}$. Also, $i\mathcal{F}_t\{\ \}$ may denote an inverse time domain Fourier transformation, and $\mathcal{F}_t\{\ \}$ may correspond to $\int_{-\infty}^{\infty} p(t,x) e^{-i\omega t} dt$.

An HOA renderer may provide an output signal driving a spherical arrangement of loudspeakers. Here, when an arrangement of the loudspeakers is not spherical, time compensation and level compensation may be performed for the arrangement of the loudspeakers.

An HOA component file may be expressed as:

<item_name>_<N>_<n><μ><±>.wav

Here, a value of "N" may denote an HOA order. n may denote an order index μ=abs(m), ±=sign(m). m may indicate an azimuth frequency index and be expressed as given in Table 5.

TABLE 5

| | |
|---|---|
| $[b_0^0(t_1), \ldots b_0^0(t_T)]$ | <item_name>_<N>_00+.wav |
| $[b_1^1(t_1), \ldots b_1^1(t_T)]$ | <item_name>_<N>_11+.wav |
| $[b_1^{-1}(t_1), \ldots b_1^{-1}(t_T)]$ | <item_name>_<N>_11−.wav |
| $[b_1^0(t_1), \ldots b_1^0(t_T)]$ | <item_name>_<N>_10+.wav |
| $[b_2^2(t_1), \ldots b_2^2(t_T)]$ | <item_name>_<N>_22+.wav |
| $[b_2^{-2}(t_1), \ldots b_2^{-2}(t_T)]$ | <item_name>_<N>_22−.wav |
| $[b_2^1(t_1), \ldots b_2^1(t_T)]$ | <item_name>_<N>_21+.wav |
| $[b_2^{-1}(t_1), \ldots b_2^{-1}(t_T)]$ | <item_name>_<N>_21−.wav |
| $[b_2^0(t_1), \ldots b_2^0(t_T)]$ | <item_name>_<N>_20+.wav |
| $[b_3^3(t_1), \ldots b_3^3(t_T)]$ | <item_name>_<N>_33+.wav |
| . . . | . . . |

Figure 10:
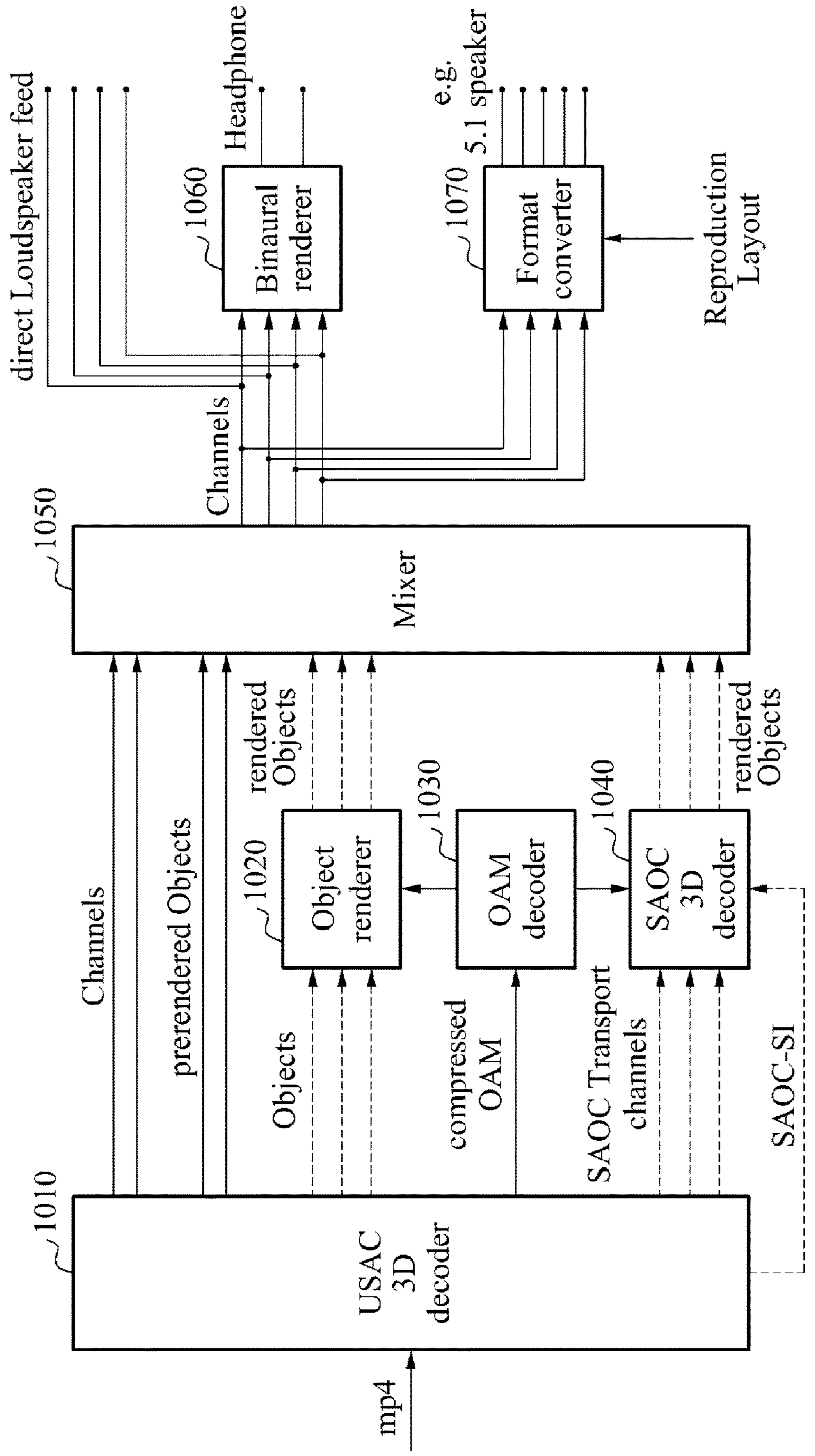
FIG. 10 is a diagram illustrating a configuration of a decoding apparatus according to another embodiment of the present invention.

FIG. 10 is a diagram illustrating a configuration of a decoding apparatus according to another embodiment of the present invention.

Referring to FIG. 10, the decoding apparatus may include a USAC 3D decoder 1010, an object renderer 1020, an OAM decoder 1030, an SAOC 3D decoder 1040, a mixer 1050, a binaural renderer 1060, and a format converter 1070.

The USAC 3D decoder 1010 may decode channel signals of loudspeakers, discrete object signals, object downmix signals, and prerendered object signals based on an MPEG USAC technology. The USAC 3D decoder 1010 may generate channel mapping information and object mapping information based on geometric information or semantic information for an input channel signal and an input object signal. Here, the channel mapping information and the object mapping information may indicate how channel signals and object signals map with USAC channel elements, for example, CPEs, SCEs, and LFEs.

The object signals may be decoded in a different manner based on rate/distortion requirements. The prerendered object signals may be coded to be a 22.2 channel signal. The discrete object signals may be input as a monophonic waveform to the USAC 3D decoder 1010. The USAC 3D decoder 1010 may use the SCEs to add object signals to channel signals and transmit the object signals.

Also, parametric object signals may be defined through SAOC parameters indicating a relationship between attributes of the object signals and the object signals. A result of downmixing the object signals may be decoded using the USAC technology and parametric information may be separately transmitted. A number of downmix channels may be determined base on a number of the object signals and entire data rate.

The object renderer 1020 may render the object signals output by the USAC 3D decoder 1010 and transmit the object signals to the mixer 1050. The object renderer 1020 may use object metadata transmitted to the OAM decoder 1030 and generate an object waveform based on a given reproduction format. Each of the object signals may be rendered into an output channel based on the object metadata.

The OAM decoder 1030 may decode the encoded object metadata transmitted from an encoding apparatus. The OAM decoder 1030 may transmit the obtained object metadata to the object renderer 1020 and the SAOC 3D decoder 1040.

The SAOC 3D decoder 1040 may restore object signals and channel signals from decoded SAOC transport channel and the parametric information. Also, the SAOC 3D decoder 1040 may output an audio scene based on a reproduction layout, the restored object metadata, and additional user control information. The parametric information may be indicated as SAOC-SI and include spatial parameters between the object signals, for example, OLD, IOC, and DMG.

The mixer 1050 may generate channel signals corresponding to a given speaker format using (i) the channel signals output by the USAC 3D decoder 1010 and prerendered object signals, (ii) the rendered object signals output by the object renderer 1020, and (iii) the rendered object signals output by the SAOC 3D decoder 1040. When channel based contents and discrete/parametric objects are decoded, the mixer 1050 may perform delay alignment and sample-wise addition on a channel waveform and a rendered object waveform.

For example, the mixer 1050 may perform the mixing using a syntax given below.

```
channelConfigurationIndex;
if (channelConfigurationIndex == 0) {
   UsacChannelConfig( );
```

Here, "channelConfigurationIndex" may indicate a loudspeaker mapped based on Table 6 below, channel elements, and a number of channel signals. The channelConfigurationIndex may be defined as rendering information for a channel signal.

TABLE 6

| value | audio syntactic elements, listed in order received | channel to speaker mapping | Speaker abbreviation | "Front/ Surr. LFE" notation |
|---|---|---|---|---|
| 0 | — | defined in UsacChannelConfig( ) | — | — |
| 1 | UsacSingleChannelElement ( ) | center front speaker | C | 1/0.0 |
| 2 | UsacChannelPairElement( ) | left, right front speakers | L, R | 2/0.0 |
| 3 | UsacSingleChannelElement ( ), UsacChannelPairElement( ) | center front speaker. left, right front speakers | C L, R | 3/0.0 |
| 4 | UsacSingleChannelElement ( ), UsacChannelPairElement( ), UsacSingleChannelElement ( ) | center front speaker, left, right center front speakers, center rear speakers | C L, R Cs | 3/1.0 |
| 5 | UsacSingleChannelElement ( ), UsacChannelPairElement( ), UsacChannelPairElement( ) | center front speaker, left, right front speakers, left surround, right surround speakers | C L, R Ls, Rs | 3/2.0 |
| 6 | UsacSingledChannelElement ( ), UsacChannelPairElement( ), UsacChannelPairElement( ), UsacLfeElement( ) | center front speaker, left, right front speakers, left surround, right surround speakers, center front LFE speaker | C L, R Ls, Rs LFE | 3/2.1 |
| 7 | UsacSingleChannelElement ( ), UsacChannelPairElement( ), UsacChannelPairElement( ), UsacChannelPairElement( ), UsacLfeEletnent( ) | center front speaker left, right center front speakers, left, right outside front speakers, left surround, right surround speakers, center front LFE speaker | C Lc, Rc L, R Ls, Rs LFE | 5/2.1 |
| 8 | UsacSingleChannelElement ( ), UsacSingleChannelElement ( ) | channel1 channel2 | N.A. N.A. | 1 + 1 |
| 9 | UsacChannelPairElement( ), UsacSingleChannelElement ( ) | left, right front speakers, center rear speaker | L, R Cs | 2/1.0 |
| 10 | UsacChannelPairElement( ), UsacChannelPairElement( ) | left, right front speaker, left, right rear speakers | L, R Ls, Rs | 2/2.0 |
| 11 | UsacSingleChannelElement ( ), UsacChannelPairElement( ), UsacChannelPairElement( ), UsacSingleChannelElement | center front speaker, left, right front speakers, left surround, right surround speakers, center rear speaker, | C L, R Ls, Rs Cs LFE | 3/3.1 |

TABLE 6-continued

| value | audio syntactic elements, listed in order received | channel to speaker mapping | Speaker abbreviation | "Front/ Surr. LFE" notation |
|---|---|---|---|---|
| | ( ), UsacLfeElement( ) | center front LFE speaker | | |
| 12 | UsacSingleChannelElement ( ), UsacChannelPairElement( ), UsacChannelPairElement( ), UsacChannelPairElement( ), UsacLfeElement( ) | center front speaker left, right front speakers, left surround, right surround speakers, left, right rear speakers, center front LFE speaker | C L, R Ls, Rs Lsr, Rsr LFE | 3/4.1 |
| 13 | UsacSingleChannelElement ( ), UsacChannelPairElement( ), UsacChannelPairElement( ), UsacChannelPairElement( ), UsacChannelPairElement( ), UsacSingleChannelElement ( ), UsacLfeElement( ), UsacLfeElement( ), UsacSingleChannelElement ( ), UsacChannelPairElement( ), UsacChannelPairElement( ), UsacSingleChannelElement ( ), UsacChannelPairElement( ), UsacSingleChannelElement ( ), UsacSingleChannelElement ( ), UsacChannelPairElement( ) | center front speaker, left, right front speakers, left, right outside front speakers, left, right side speakers, left, right back speakers, back center speaker, left front low freq. effects speaker, right front low freq. effects speaker, top center front speaker, top left, right front speakers, top left, right side speakers, center of the room ceiling speaker, top left, right back speakers, top center back speaker, bottom center front speaker, bottom left, right front speakers | C Lc, Rc L, R Lss, Rss Lsr, Rsr Cs LFE LFE2 Cv Lv, Rv Lvss, Rvss Ts Lvr, Rvr Cvr Cb Lb, Rb | 11/11.2 |
| 14 | UsacChannelPairElement( ), UsacSingleChannelElement ( ), UsacLfeElement( ), UsacChannelPairElement( ), UsacChannelPairElement( ), UsacSingleChannelElement ( ), UsacLfeElement( ), UsacChannelPairElement( ), UsacChannelPairElement( ), UsacSingleChannelElement ( ), UsacSingleChannelElement ( ), UsacChannelPairElement( ), UsacChannelPairElement( ), UsacSingleChannelElement ( ), usacSingleChannelElement ( ), UsacChannelPairElement( ) | CH_M_L060, CH_M_R060, CH_M_000, CH_LFE1, CH_M_L135, CH_M_R135, CH_M_L030, CH_M_R030, CH_M_L180, CH_LFE2, CH_M_L090, CH_M_R090 CH_U_L045, CH_U_R045, CH_U_000, CH_T_000, CH_U_L135, CH_U_R135, CH_U_L090, CH_U_R090, CH_U_L180, CH_L_000, CH_L_L045, CH_L_R045 | | 22.2 |
| 15 | UsacChannelPairElement( ), UsacChannelPairElement ( ), UsacLfeElement( ), UsacChannelPairElement( ), UsacChannelPairElement( ), UsacChannelPairElement( ), UsacChannelPairElement( ), UsacChannelPairElement( ), UsacLfeElement( ), UsacChannelPairElement ( ), UsacChannelPairElement ( ), UsacChannelPairElement( ), UsacChannelPairElement( ), | CH_M_000, CH_L_000, CH_U_000, CH_T_000, CH_LFE1, CH_M_L135, CH_U_L135, CH_M_R135, CH_U_R135, CH_M_L030, CH_L_045, CH_M_R030, CH_L_R045, CH_M_L180, CHU_U_180, CH_LFE2, CH_M_L090, CH_U_L090, CH_M_R090, CH_U_R090, CH_M_L060, CH_U_L045, CH_M_R060, CH_U_R045 | | 22.2 |
| 16 | reserved | | | |
| | UsacSingleChannelElement ( ), UsacSingleChannelElement ( ), | CH_M_000, CH_U_000, CH_M_L135, | | 14.0 |

TABLE 6-continued

| value | audio syntactic elements, listed in order received | channel to speaker mapping | Speaker abbreviation | "Front/ Surr. LFE" notation |
|---|---|---|---|---|
| | UsacChannelPairElement( ), UsacChannelPairElement( ), UsacChannelPairElement( ), UsacChartnelPairElement ( ), UsacSingleChannelElement ( ), UsacSingleChannelElement ( ), UsacChannelPairElement( ), | CH_M_R135, CH_U_L135, CH_U_R_135, CH_M_L030, CH_M_R030, CH_U_L045, CH_U_R045, CH_U_000, CH_U_L180, CH_U_L090, CH_U_R090 | | |
| 18 | UsacSingleChannelElement ( ),UsacSingleChannelElement ( ), UsacChannelPairElement( ), UsacChannelPairElement( ), UsacChannelPairElement( ), UsacChannelPairElement ( ), UsacSingleChannelElement ( ), UsacSingleChannelElement ( ), UsacChannelPairElement( ), | CH_M_000, CH_U_000, CH_M_L135, CH_U_L135, CH_M_R135, CH_U_R135, CH_M_L030, CH_U_L045, CH_M_R030, CH_U_R045, CH_U_000, CH_U_L180, CH_U_L090, CH_U_R090 | | 14.0 |
| 19 | reserved | | | |
| 20 | UsacChannelPairElement( ), UsacChannelPairElement( ), UsacChannelPairElement( ), UsacChannelPairElement( ), UsacChannelPairElement( ), UsacSingleChannelElement ( ), UsacLfeElement( ), | CH_M_L030, CH_M_R030, CH_U_L030, CH_U_R030, CH_M_L110, CH_M_R110, CH_U_L110, CH_U_R110, CH_M_000, CH_U_000, CH_U_000, CH_LFE1 | | 11.1 |
| 21 | UsacChannelPairElement( ), UsacChannelPairElement( ), UsacChannelPairElement( ), UsacChannelPairElement( ), UsacChannelPairElement( ), UsacSingleChannelElement ( ), UsacLfeElement( ) | CH_M_L030, CH_U_L030, CH_M_R030, CH_U_R030, CH_M_L110, CH_U_L110, CH_M_R110, CH_U_R110, CH_M_000, CH_U_000, CH_U_000, CH_LFE1 | | 11.1 |
| 22 | reserved | | | |
| 23 | UsacChannelPairElement( ), UsacChannelPairElement( ), UsacChannelPairElement( ), UsacChannelPairElement( ), UsacSingleChannelElement ( ) | CH_M_L030, CH_M_R030, CH_U_L030, CH_U_R030, CH_M_L110, CH_M_R110, CH_U_L110, CH_U_R110, CH_M_000 | | 9.0 |
| 24 | UsacChannelPairElement( ), UsacChannelPairElement( ), UsacChannelPairElement( ), UsacChannelPairElement( ), UsacSingleChannelElement ( ) | CH_M_L030, CH_U_L030, CH_M_R030, CH_U_R030, CH_M_L110, CH_U_L110, CH_M_R110, CH_U_R110, CH_M_000 | | 9.0 |
| 25-30 | reserved | | | |
| 31 | UsacSingleChannelElement ( ) UsacSingleChannelElement ( ) . . . (1 to numObjects) | contains numObjects single channels | | |

The channel signals output by the mixer 1050 may be fed directly to a loudspeaker to be played. The binaural renderer 1060 may perform binaural downmixing on channel signals. Here, a channel signal input to the binaural renderer 1060 may be indicated as a virtual sound source. The binaural renderer 1060 may operate in a frame proceeding direction in a Quadrature Mirror Filter (QMF) domain. The binaural rendering may be performed based on a measured binaural room impulse response.

The format converter 1070 may perform format conversion on a configuration of the channel signals transmitted from the mixer 1050 and a desired speaker reproduction format. The formal converter 1070 may downmix a channel number of the channel signals output by the mixer 1050 and convert the channel number to a lower channel number. The format converter 1070 may downmix or upmix the channel signals to optimize the configuration of the channel signals output by the mixer 1050 to be suitable for a random configuration including a nonstandard loudspeaker configuration in addition to a standard loudspeaker configuration.

According to embodiments of the present invention, rendering information for a channel signal may be encoded and transmitted along with channel signals and object signals and thus, a function of processing the channel signals based on an environment in which an audio content is output may be provided.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. A decoding apparatus, comprising:

a first decoder to output channel signals and object signals;

a second decoder to decode an object metadata; and a renderer to generate an object waveform using the object metadata, wherein the object signals are rendered into output channel signals for loudspeakers based on the object metadata, wherein the channel signals are rendered based on first control information, second control information, and third control information to control the channel signals.

2. The decoding apparatus of claim 1, wherein the first control information includes control information to control a volume or a gain of the channel signals, the second control information includes control information to control a horizontal rotation of the channel signals, and the third control information includes control information to control a vertical rotation of the channel signal.

3. The decoding apparatus of claim 1, wherein the object signals include discrete object signals.

4. The decoding apparatus of claim 1, the renderer generates the object waveform according to a given reproduction format using the object metadata.

5. The decoding apparatus of claim 1, further comprising:

a third decoder to restore the object signals and the channel signals from a decoded transport channel and parametric information, and to output an audio scene based upon a reproduction layout and the object metadata.

6. The decoding apparatus of claim 1, further comprising:

a mixer to perform delay alignment and sample-wise addition for the object waveform.

7. The decoding apparatus of claim 1, further comprising:

a format converter to perform format conversion between a configuration of the channel signals and a desired speaker reproduction format.

8. The decoding apparatus of claim 7, wherein the format converter is suitable for a random configuration for a nonstandard loudspeaker configuration, and a standard loudspeaker configuration.

9. The decoding apparatus of claim 1, further comprising:

a binaural renderer to perform binaural downmixing of the channel signals.

10. The decoding apparatus of claim 1, wherein the first decoder generates channel mapping information and object mapping information based upon geometric information or semantic information for the channel signals and the object signals.

11. The decoding apparatus of claim 10, wherein the channel mapping information and the object mapping information indicate how the channel signals and the object signals map with channel elements including channel pair elements (CPEs), single channel elements (SCEs), and low frequency effects (LFEs).

12. A decoding method, comprising:

outputting, by a first decoder, channel signals and object signals;

decoding, by a second decoder, an object metadata; and generating, by a renderer, an object waveform using the object metadata, wherein the object signals are rendered into output channel signals for loudspeakers based on the object metadata, wherein the channel signals are rendered based on first control information, second control information, and third control information to control the channel signals.

13. The decoding method of claim 12, wherein the first control information includes control information to control a volume or a gain of the channel signals, the second control information includes control information to control a horizontal rotation of the channel signals, and the third control information includes control information to control a vertical rotation of the channel signal.

14. The decoding method of claim 12, further comprising:

restoring, by a third decoder, the object signals and the channel signals from a decoded transport channel and parametric information, and to output an audio scene based upon a reproduction layout, and the object metadata.

15. The decoding method of claim 12, further comprising:

performing, by a mixer, delay alignment and sample-wise addition for the object waveform.

16. The decoding method of claim 15, wherein the channel mapping information and the object mapping information indicate how the channel signals and the object signals map with channel elements including channel pair elements (CPEs), single channel elements (SCEs), and low frequency effects (LFEs).

17. The decoding method of claim 12, further comprising:

performing, by a format converter, format conversion between a configuration of the channel signals and a desired speaker reproduction format.

18. The decoding method of claim 17, wherein the format converter is suitable for a random configuration for a non-standard loudspeaker configuration, and a standard loudspeaker configuration.

19. The decoding method of claim 12, further comprising: performing, by a binaural renderer, binaural downmixing of the channel signals.

20. The decoding method of claim 12, wherein the first decoder generates channel mapping information and object mapping information based upon geometric information or semantic information for the channel signals and the object signals.

* * * * *